United States Patent [19]

Hoffmann

[11] 4,378,572
[45] Mar. 29, 1983

[54] CAMERA INTERFACE

[75] Inventor: Frank H. Hoffmann, Wheaton, Md.

[73] Assignee: Professional Products, Inc., Bethesda, Md.

[21] Appl. No.: 229,951

[22] Filed: Jan. 29, 1981

[51] Int. Cl.³ .............................................. H04N 1/22
[52] U.S. Cl. ................................... 358/335; 358/908; 360/67; 369/24; 369/69
[58] Field of Search ............... 360/33.1; 358/335, 210, 358/906, 908

[56] References Cited

U.S. PATENT DOCUMENTS 4,097,893 6/1978 Camras ................................ 358/906

OTHER PUBLICATIONS

*Broadcasting Systems & Operation*, Jan. 1980, vol. 3, No. 1, pp. 11, 13, 14 & 16, "The Technical and Operational Aspects of Two New Broadcast Color Cameras", H. Zettl.

Primary Examiner—George G. Stellar
Attorney, Agent, or Firm—Harvey B. Jacobson; Clarence A. O'Brien

[57] ABSTRACT

A pulse generating electronic circuit is utilized as a matching network between a line operated video tape recorder (VTR) and a battery powered portable camera. Through the use of appropriate logic circuitry, the pause control button of the VTR, which normally operates to provide an on or off signal pulse, is disabled, and the time delay experienced by a camera activated electrical signal passing through the VTR electronics is utilized to generate the on or off signal pulse.

6 Claims, 3 Drawing Figures

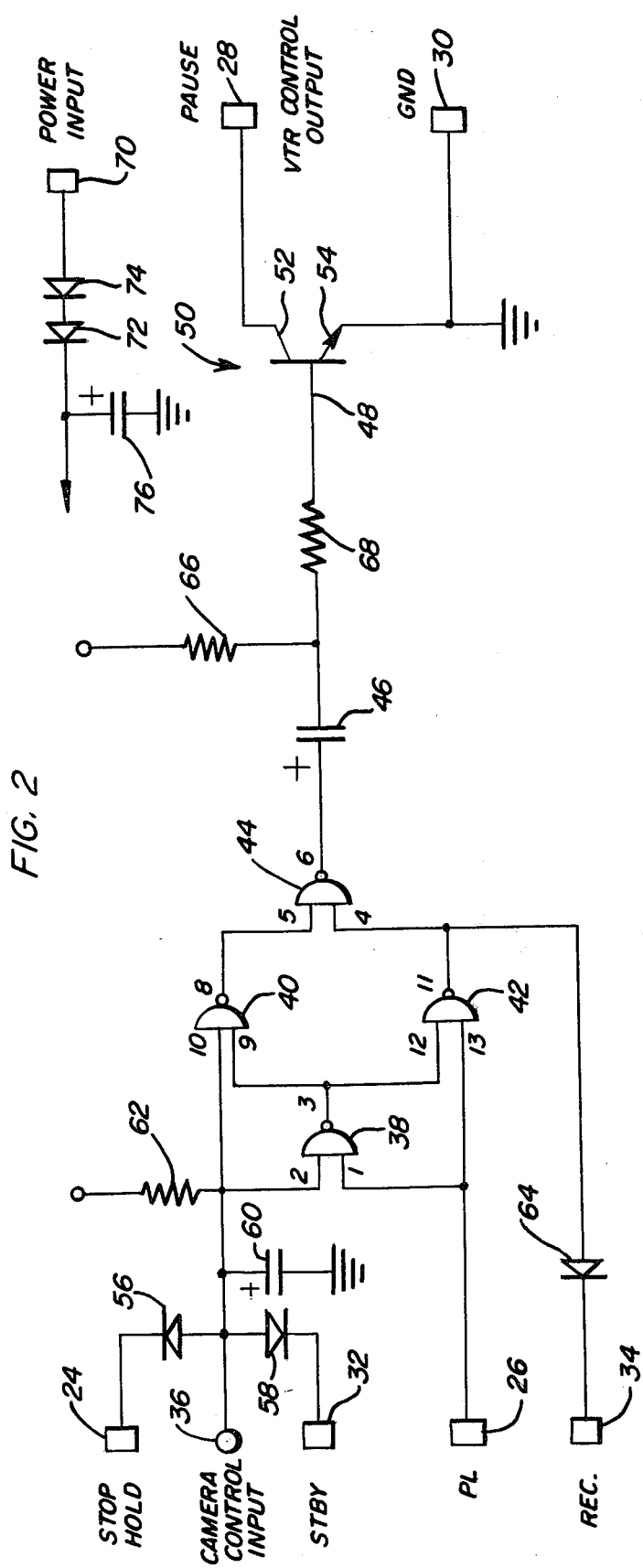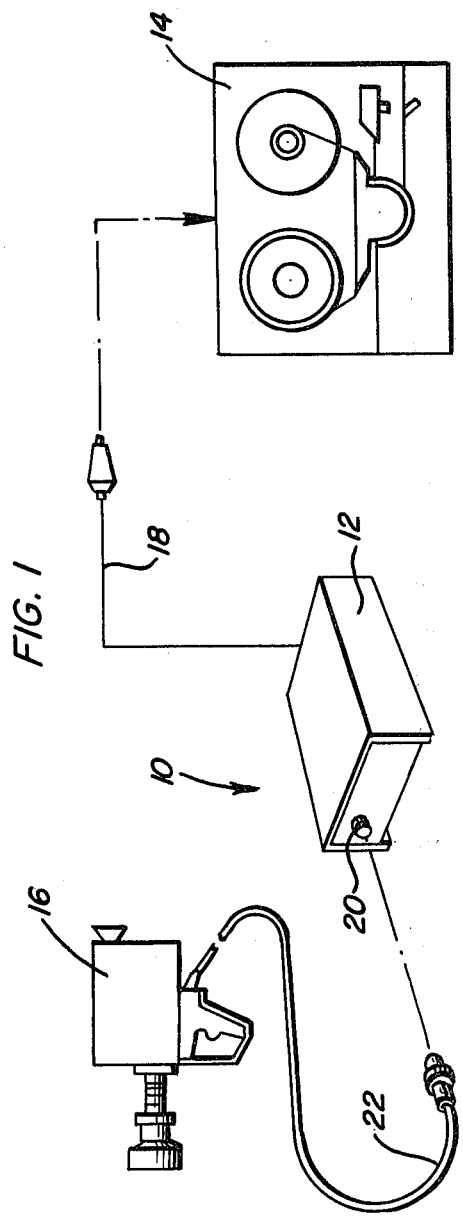

CAMERA INTERFACE

BACKGROUND OF THE INVENTION

1. Field of the Invention

The present invention relates generally to cameras operable in connection with video tape recorders and more particularly pertains to a matching network for operably connecting a battery powered camera to a line operated video tape recorder.

2. Description of the Prior Art

The use of television cameras in combination with video tape recorders is generally well-known in the art. For example, U.S. Pat. No. 3,974,522, issued Aug. 10, 1976, to Fukatsu et al, discloses a television camera and video tape recorder combination which is illustrative of the type of equipment now conventionally and commercially available on the market. In this respect, the Fukatsu et al video tape recorder and camera combination is line powered, i.e., it is operable only through the use of an alternating current supply such as is conventionally available from a plug-in wall type electric outlet. As can be appreciated, both video tape recorders and their optional television cameras are quite expensive. Additionally, there are commercially available battery-powered television cameras which are somewhat less expensive than line operated television cameras, and as can be expected, budget considerations often dictate that a purchaser must use a battery operated television camera in combination with his line operated video tape recorder.

In this respect, such a combined use of a battery powered television camera with a line operated video tape recorder frequently presents problems. For example, with line operated video tape recorders, there is often provided a single button that engages the pause or stop on one push, and then disengages the pause on a subsequent push. As such, the capstan solenoids associated with such line operated video tape recorders operate in response to an electrical signal in the form of a pulse. By the same token, most cameras which are battery powered utilize on and off triggers which must be manually and continually held in an engaged position when it is desired to operate the camera and are manually releasable when it is desired to cease operating. As such, the combination of a line operated video tape recorder and a battery powered camera requires that the video tape recorder be started through an activation of the on/off button, and the recorder then will continually run whether or not the associated television camera is being utilized. By example then, it can be seen that an operator would first have to turn on the video tape recorder and then depress the television camera on and off button to operate the same. At such time that the operator desires to cease utilizing the combinaton, he must first stop the television camera by releasing the on and off trigger and then must journey to the video tape recorder to effect a turning off of the same.

Accordingly, it can be appreciated that there exists a need for a matching electronic circuit which would efficiently connect a battery powered television camera to a line operated video tape recorder in a manner whereby an activation of the on and off trigger mechanism associated with the camera would simultaneously activate the respective on and off circuitry of the video tape recorder. In this respect, the present invention substantially fulfills this need.

SUMMARY OF THE INVENTION

The general purpose of the present invention, which will be discussed subsequently in greater detail, is to provide a matching network for a battery powered television camera utilizable in combination with a line operated video tape recorder that has all of the advantages of the prior art matching networks and none of the disadvantages. To attain this, the present invention provides an electronic circuit which utilizes a plurality of NAND gates to convert a square wave electrical signal received from a battery powered television camera into a pulse-shaped electrical signal so as to operate a line operated video tape recorder. Specifically, a low signal is present at the camera control input while the same is running, while a low signal is similarly present at the VTR's pause control, through the use of a buffer NPN transistor which is normally biased on, and the pause lamp, which is also associated with the line operated video tape recorder. The pause control is held low purposely to disable the action of the pause button located on or associated with the VTR itself. The matching network of the present invention comprises four NAND gates in combination with an isolation capacitor and the aforementioned NPN transistor which couples the camera to the video tape recorder. When the camera is turned off, a high signal is realized at the camera control input, such high signal resulting in an output pin of one of the plurality of NAND gates going high to thus turn on the transistor. The transistor then delivers a pulse to the pause control resulting in the same going high, and the high signal at the pause control is similarly delivered to the pause lamp so as to turn on the lamp, thus indicating that the camera and the video tape recorder are off. At the same time, the high signal realized at the pause lamp is transmitted once more through the NAND gates so as to reduce the output thereof to a low signal at the aforementioned output pin. The recognizable delay of the electrical signal being transmitted through the VTR electronics is essentially what generates the pulse that operates the pause control of the video tape recorder.

It is therefore an object of the present invention to provide a matching network for combining a battery powered television camera with a line operated video tape recorder that has all of the advantages of the prior art matching networks and none of the disadvantages.

It is another object of the present invention to provide a matching network that will permit an efficient operation of a battery powered television camera in combination with a video tape recorder.

Still another object of the present invention is to provide an electronic circuit which is effectively a square wave to pulse converter.

Yet another object of the present invention is to eliminate some of the complexities associated with utilizing a battery powered television camera in combination with a line operated video tape recorder.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view illustrating the manner in which the matching network forming the present invention may be operably connected between a battery powered television camera and a line operated video tape recorder.

FIG. 2 is an electronic circuit diagram illustrating the basic construction of the camera interface network forming the present invention.

DESCRIPTION OF THE PREFERRED EMBODIMENT

Figure 3:
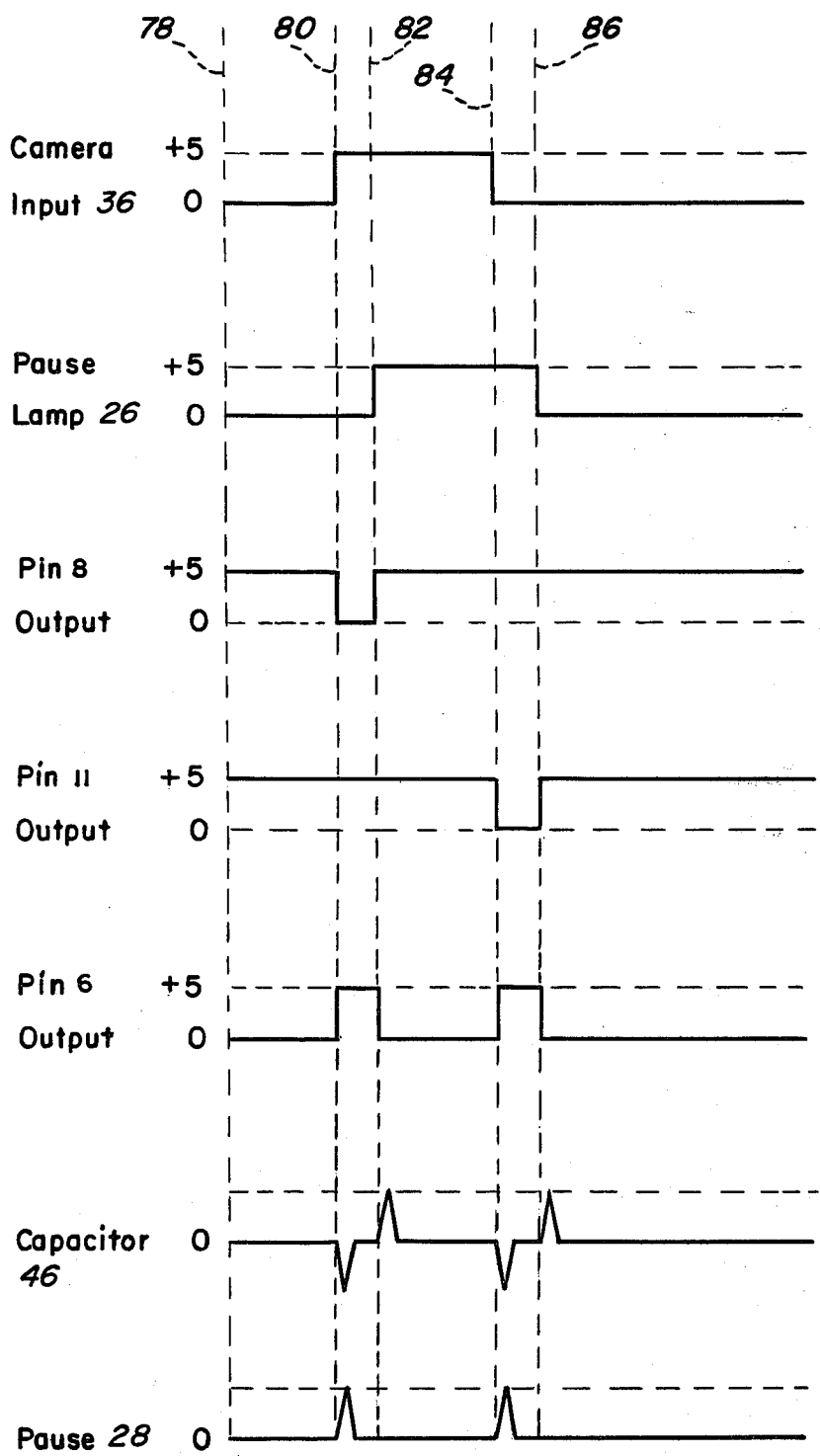
FIG. 3 is an illustration of the various signals recognized in the circuit forming the present invention.

With reference now to the drawings and in particular to FIG. 1 thereof, a camera interface matching network embodying the principles and concepts of the present invention and generally designated by the reference numeral 10 will be described. Specifically, it can be seen that the camera interface matching network 10 may be enclosed in a housing 12 or alternatively, it could be built right into the connection adaptor associated with a video tape recorder (VTR) 14. In this regard, the matching network 10 serves to connect the line operated video tape recorder 14 to a battery powered television camera 16 in the manner illustrated. If desired, a connector 18 may be used to plug into the video tape recorder 14 while an adaptor 20 may be associated with the network 10 so that the plug-in lead or connector 22 associated with the camera 16 may be operably connected thereto. In the preferred embodiment of the present invention, the housing 10 may be dispensed with, since the electronic circuitry associated with the invention is sufficiently small to be built directly into the pin connection adaptor associated with the line operated VTR 14.

With reference now to FIG. 2 of the drawings, it can be seen that the matching network 10 includes seven connections associated with the line operated video tape recorder 14 and one input connection associated with the camera 16. Specifically, the video tape recorder 14 includes a stop hold input connection 24, a pause lamp connection 26, a pause control connection 28, a power input connection 70 and a ground connection 30. Additionally, a standby connection 32 and a record connection 34 may be optionally provided. By the same token, a camera control input connection 36 is illustrated as being in operable and electrical communication with the various described connections associated with the video tape recorder 14.

More particularly, it can be seen that the electronic circuit of FIG. 2 further includes a first NAND gate 38 having input pin connections 1 and 2 and an output pin connection 3. The output at pin connection 3 is deliverable to pin 9 of a second NAND gate 40 and is similarly deliverable to pin connection 12 of a third NAND gate 42. The respective outputs of NAND gates 40, 42 are then deliverable through output pin connections 8 and 11 to the respective input pin connections 5 and 4 associated with a fourth NAND gate 44. The output of the fourth NAND gate 44 is deliverable through a pin connection 6 to the positive side of an isolation and differentiator capacitor 46, such capacitor being in electrical communication with the base 48 of an NPN transistor 50 acting as a control pulse generator. By the same token, the collector 52 of the transistor 50 is connected to the pause control 28, while the emitter 54 is directed to the ground 30.

Further illustrated in FIG. 2 is the use of two isolation diodes 56, 58 which are respectively connected between the stop hold connection 24 and the standby connection 32 associated with the recorder 14, and the camera control input 36 associated with the camera 16. These two diodes serve as interlocks so that when the video tape recorder 14 is in standby, i.e., threading the tape, the camera 16 cannot be operated. In effect, the isolation diodes 56, 58 operate to keep the recorder from being in pause or off between modes of operation. In this regard, the stop hold connection 24 is utilized to reset the video tape recorder 14 so as to take the same out of pause, and the isolation diodes 56, 58 then assure that an operator cannot ground both connections simultaneously.

Also illustrated in FIG. 2 is a signal spike suppressor in the form of a capacitor 60 operably connected between the camera control input 36 and ground 30, while a pull-up resistor 62 may be provided to pull the operating voltage up to the point where a good five volt signal is provided to the respective gates 38, 40. With respect to the aforementioned pause lamp connection 26, the same operates to power an electric bulb in response to a high signal being delivered thereto, and the operation of the bulb indicates that both the television camera 16 and the video tape recorder 14 are inoperative. Effectively, there is a finite delay from the time the camera 16 is started or stopped and the time before the pause lamp connection 26 will go either high or low. This electronic delay in the video tape recorder 14 is utilized to effect the operation of the pause control 28, thereby to turn the same on or off as desired. As to the optional record connection 34, the same is utilized to make sure that the video tape recorder 14 automatically goes into record. In this regard, the record connection 34 is frequently not utilized. To facilitate its use, however, a further isolation diode 64 may be provided in operable connection therewith. In this connection, the isolation diode 64 functions in the same manner as the isolation diodes 56, 58 as aforedescribed.

Further illustrated in FIG. 2 is the use of a bias and pull-up resistor 66 for controlling the voltage supplied to the transistor 50, while a resistor 68 is operably and serially connected between the capacitor 46 and the base 48 of the transistor. In this respect, the resistors 66, 68 are provided to keep the transistor 50 normally biased on. Effectively, the transistor 50 operates as a buffer transistor to isolate the circuitry of the present invention from the video tape recorder 14, and the differentiator and isolation capacitor 46 operates to permit a signal being delivered to the transistor 50 only during a change of state between the pin connection 6 associated with the NAND gate 44 and the pause control 28. Lastly illustrated in FIG. 2 is the aforementioned power input connection 70 which is effectively the remote connector on the video tape recorder 14 and which serves to supply 6.8 volts to power the circuitry of the present invention. Two diodes 72, 74 may be provided to facilitate a predetermined voltage drop thereacross so as to assure that approximately 5 volts are delivered to the circuit thus to run the logic in the desired manner. In other words, the diodes 72, 74 operate in conjunction with a signal spike suppressing capacitor 76 as a regulator of the voltage supplied to the circuitry of the invention.

To understand the operation of the present invention, reference is made to FIG. 3 of the drawings, which will be discussed concurrently with the operation of the circuitry of FIG. 2. Specifically, FIG. 3 illustrates the various signals realizable at certain points in the circuit at certain times of circuit operation. For example, reference to vertical line 78 in FIG. 3 illustrates the signals observable when both the camera 16 and the video tape recorder 14 are running. In this respect, a low signal is observable at the camera control input 36 and at the pause lamp control 26. As can be appreciated with reference to FIG. 2, the low signal at the camera control input 36 is inputted to pin 10 of NAND gate 40 and to pin 2 of NAND gate 38. By the same token, the low signal at the pause lamp 26 is inputted to pin 13 of NAND gate 42 and to pin 1 of NAND gate 38. The low signals on pins 1 and 2 result in a high signal on pin 3, which is the output of the NAND gate 38, and this high signal is deliverable to pin 9 of NAND gate 40 and to pin 12 of NAND gate 42. Accordingly, a high signal is outputted on pin 8 of NAND gate 40 and on pin 11 of NAND gate 42. These respective high signals are deliverable to pins 5 and 4 of NAND gate 44 thus resulting in a low output on pin 6 of that gate. Similarly, a low signal is maintained at the pause control 28 through the use of the buffer transistor 50 so as to disable the VTR's pause control button.

At the point in time, as defined by vertical line 80 in FIG. 3, when the camera is initially shut off, the signal on the camera control input 36 goes high which concurrently results in the signal on pin 10 of NAND gate 40 going high, as well as pin 2 of NAND gate 38 going high. Accordingly, the output on pin 8 changes to low, while the output on pin 3 of NAND gate 38 is uneffected. The low signal on pin 8 is deliverable to pin 5 of NAND gate 44, thus resulting in a high signal being outputted on pin 6 of NAND gate 44 as a square triggering pulse as shown in FIG. 3. This change of state results in a negative voltage being identifiable over capacitor 46 thereby cause the transistor 50 to be momentarily turned off so as to send a high signal in the form of a sharp control pulse, to the pause control 28 as also shown in FIG. 3.

During a finite period of time as defined between the vertical lines 80 and 82, the high signal on the pause control 28, through the logic circuitry of the VTR, is transmitted to the pause lamp 26, thereby resulting in the low signal on the pause lamp being converted to a high signal. This, of course, results in a high signal being delivered to pin 1 of NAND gate 38, thus changing the output of that gate to a low signal at pin 3, and further results in a high signal being delivered to pin 13 of NAND gate 42. However, since the low output of pin 3 is delivered to pin 12 of NAND gate 42, the high output on pin 11 does not change. To the contrary, the low output on pin 3 is delivered to pin 9 of NAND gate 40, thus resulting in the output on pin 8 once again going high, as shown on vertical line 82 of FIG. 3, and this accordingly results in the output on pin 6 of NAND gate 44 again going low. As such, the change of state over capacitor 46 results in the illustrated positive voltage differential which simply causes transistor 50 being further forced on.

With both the camera 16 and the video tape recorder 14 now turned off, a high signal is present at the camera control input 36 and at the pause lamp 26. These signals result in a high signal being present at pin 8 of NAND gate 40 and a high signal being present at pin 11 of NAND gate 42, which of course results in a low signal being present at pin 6 of NAND gate 44. If the camera 16 is once again started, as identified by the time line 84 in FIG. 3, a low signal is realized at the camera control input 36 which results in a high signal being realized at pin 3 of NAND gate 38, thus to result in a low signal on pin 11 of NAND gate 42. This change of signal again results in pin 6 of NAND gate 44 going high so as to turn off the transistor 50 and initiate the sending of a pulse to the pause control 28 so as to turn the video tape recorder 14 on once again. As aforementioned, the finite time it takes for the signals to traverse the logic circuitry of the VTR results in a delay of the signal available at the pause lamp 26. This pulse is delivered to the pause lamp 26 so as to cause the same to go low, thus to again affect the output of pin 11 of NAND gate 42, driving it high once more. As such, the output of pin 6 again goes low. Effectively then, it can be seen that the pause lamp 26 operates during each on/off cycle to reset the circuitry.

With respect to the above description, it should be realized that the optimum dimensional relationships for the parts of the invention are deemed readily apparent and obvious to one skilled in the art to which the invention pertains, and all equivalent relationships to those illustrated in the drawings and described in the specification, to include modification of form, size, arrangement of parts and details of operation, are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a first device having a switch actuated to change the operational mode of the first device between operating and non-operating conditions, a second device having a signal operated control through which sequential control pulses cause a delayed change in the operational mode of the second device between operating and non-operating conditions, and signal conducting means interconnecting the first and second devices for transmitting signals therebetween when the devices are simultaneously in the operating conditions thereof, the improvement including pulse generating means connected to the signal operated control for supply of said control pulses thereto in response to triggering pulses, interfacing means connected to the first and second devices for sensing said conditions thereof, and logic means connecting the interfacing means to the pulse generating means for supply of the triggering pulses thereto in response to different conditions of the first and second devices.

2. The combination of claim 1 wherein said first and second devices are video camera and video recorder, respectively.

3. The combination of claim 2, wherein said logic means comprises a gate circuit generating the triggering pulses.

4. The combination of claim 3 wherein said pulse generating means comprises a transistor rendered nonconductive by said triggering pulses.

5. The combination of claim 1 wherein said logic means comprises a gate circuit generating the triggering pulses.

6. The combination of claim 5 wherein said pulse generating means comprises a transistor rendered nonconductive by said triggering pulses.

* * * * *